United States Patent [19]
Momose et al.

[11] Patent Number: 4,851,266
[45] Date of Patent: Jul. 25, 1989

[54] SURFACE TREATMENT OF POWDERFREE SURGICAL GLOVES

[76] Inventors: Akira Momose, 1-100 Umeda, Kiryu, Gunma, Japan, 376-06; Fumihiko Nakano, 1402-3, Moka Tochigi, Japan, 321-47

[21] Appl. No.: 200,513

[22] Filed: May 31, 1988

[51] Int. Cl.⁴ .............................................. B05D 3/00
[52] U.S. Cl. ........................................ 427/353; 2/16; 2/167; 2/163
[58] Field of Search .................. 427/353; 2/167, 168, 2/16

[56] References Cited
U.S. PATENT DOCUMENTS 2,102,456  12/1937  Brill et al. .......................... 427/353
4,597,108   7/1986  Momose ............................. 427/204

Primary Examiner—Stanley Silverman
Attorney, Agent, or Firm—Singer & Singer

[57] ABSTRACT

A method of halogenating the outer and inner surfaces of a latex article such as a glove or girdle to different degrees thereby providing different slippery coefficient surfaces on the outside and the inside of the article within the need of powders, resins or exterior finishes and which results in less free chlorine atoms being released into the atmosphere.

3 Claims, 1 Drawing Sheet

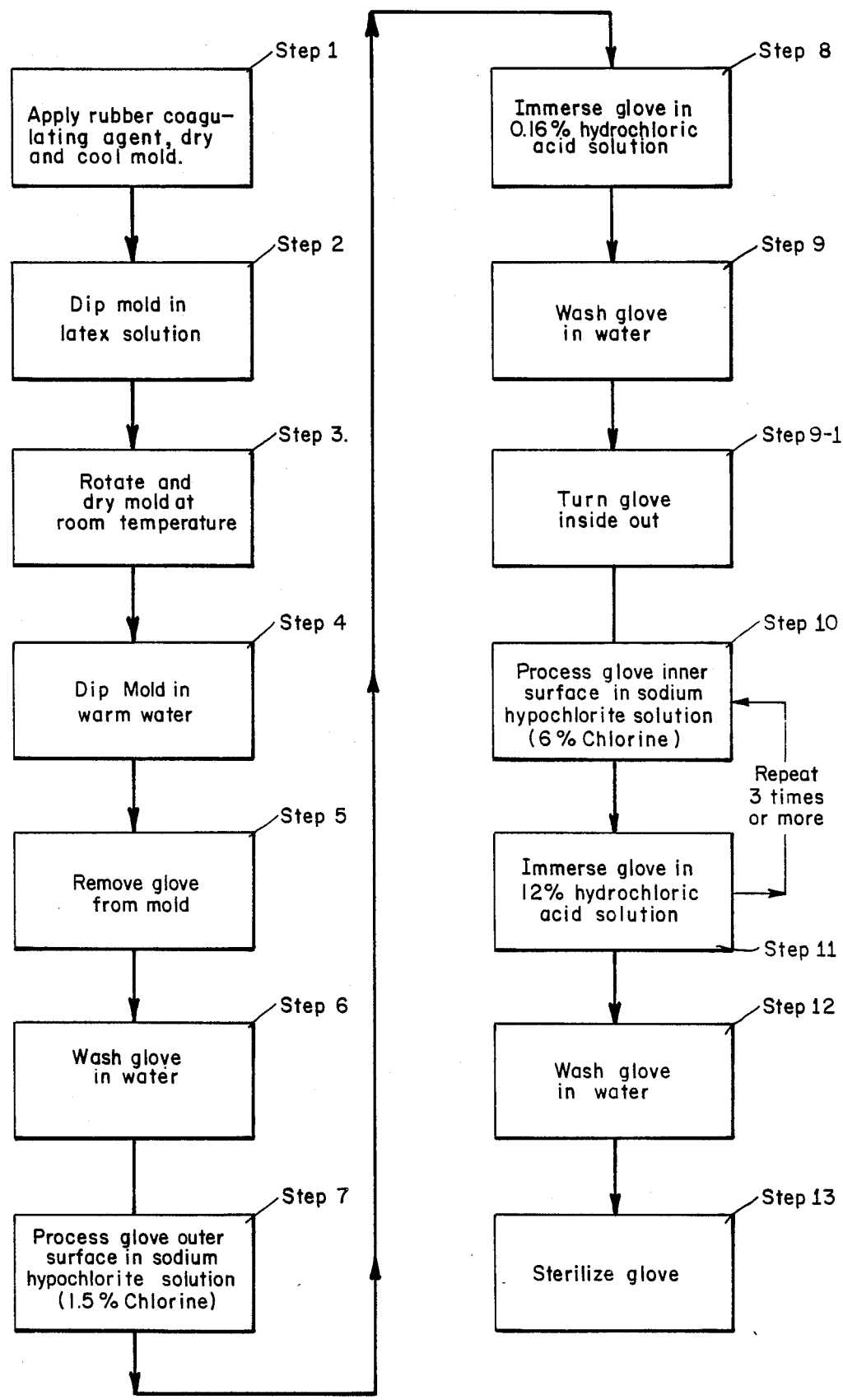

SURFACE TREATMENT OF POWDERFREE SURGICAL GLOVES

This invention relates primarily to a natural rubber glove used by surgeons in which the inner surface and the outer surface of the glove are halogenated to different degrees to thereby provide different degrees of slipperiness and without the need of powders or external finishes.

The improved chlorination process described results in less chlorine gas being released into the atmosphere and allows a higher measure of control over the halogenation of the glove surfaces.

The prior art relating to surgical gloves have long recognized the need for producing a glove having a certain outer surface frictional coefficient that will enable the surgeon to securely hold and handle various surgical instruments during operative procedures.

The prior art has long recognized that natural rubber in the form of pure latex produces the best glove for the surgeon in terms of wearing comfort and tactile sensitivity. Unfortunately the natural latex rubber poses a donning problem for the surgeon when inserting his hand into the glove due to friction between the glove and the hand which results in a tendency of the glove to stick to the hand and bunch up on the surgeon's hand during the insertion process. This process complicates and compromises the sterility and cleanliness of the gloves when finally donned by the surgeon.

The prior art recognized these problems and suggested the use of powders of different kinds such as talcum powder, corn starch and other proprietary powders that have the effect of lubricating the inside of the glove thereby making the insertion of the surgeon's hand easier and capable of being performed by a single person without the undesirable side effects mentioned above.

Unfortunately the use of lubricating powder to dust the glove can not be limited to the inside of the glove as the powder must also be applied to the outer surface of the gloves as well to prevent adhesion of latex to adjoining latex unless the outer surface is treated to make it non-sticky.

In addition, spilling of the powder from the inside to the outside of the glove can occur from the sleeve of the glove during the insertion process or if a pinhole or a puncture should occur.

Recent experimentations have shown that the different lubricating powders used on surgical gloves have a deleterious effect in that contamination of the patient is possible and in many cases serious side effects have occurred which have been proven to be the result of contamination caused by the lubricating powders used by the surgeon.

The problems associated with contamination resulting from corn starch, powder and the like have been commented upon in an article entitled Powderfree Surgical Gloves appearing in a magazine entitled Ophthalmic Surgery by Villasenor, Harris, Barron, Krasnow and Salz of the Estelle Doheny Eye Foundation, University of Southern California School of Medicine, Los Angeles, Calif.

The article is cited primarily for its extensive bibliography concerning the contamination resulting from lubricating powders used on surgical gloves.

The prior art recognized these problems and attempted to solve them by making both the outside of the glove and the inside of the glove more slippery by means of a halogenation process. These attempts were successful in varying degrees except that the halogenation process had the unfortunate side effect of making the glove very slippery, causing the glove to be unstable on the hands of the surgeon. Additionally, the outside of the glove then became too slippery which prevented the surgeon from successfully holding and manipulating the instruments in his hand. Moreover, the halongenation process, unless precisely controlled, frequently resulted in excessive halogenation and deterioration of the latex, reducing the mechanical strength of the gloves.

The prior art attempted to overcome these difficulties by means of limited halogenation on both the external and internal surfaces of the glove combined with the use of powder on the inside of the glove for additional lubrication.

A review of the art shows that U.S. Pat. No. 3,411,982 entitled "Elastomeric Article Having A Slip Coating" by J. J. Kavalir, et al, discloses the process of halogenating the surface of the rubber glove with bromine or chlorine to make it slippery. The Kavalir patent is disclosed primarily to show other solutions of utilizing a halogenation process in developing slip coating to achieve the desired slipperiness of the outer surface of the glove.

U.S. Pat. No. 3,740,262 entitled "Dual Finish Surgeon's Glove and Method of Making Same" issued to A. J. Agostinelli, also teaches the treatment of a surface of a surgeon's glove with any halogen and preferably chlorine or bromine.

Interestingly, the Agostinelli Patent recognizes that treating the inside of the glove with the halogenation process makes the glove too slippery and hence unacceptable and, here again, he discloses the use of suitable lubricating powders to solve the insertion problem. The patent is interesting for the complete disclosure of the problems associated with utilizing a surgeon's glove and he does disclose many procedures for minimizing the effect of the powder used to minimize patient contamination by the powder.

U.S. Pat. No. 3,967,014 entitled "Rubber Articles Having Improved Slip Coating" issued to P. E. Esemplare et al, also discloses the concept of using a slip coating on the inner surface of the rubber glove as a means of controlling the slipperiness on the inner surface of the glove. This patent is cited to show the development of the art in minimizing the use of lubricating powders on surgical gloves.

U.S. Pat. No. 3,992,221 entitled "Method of Treating Extensible Hydrocarbon Articles" issued to Homsy, et al, discloses a preferred method of halogenating the outer surface of a surgeon's glove. This patent discloses certain advantages of utilizing chlorine gas during the halogenation process as opposed to fluorine or other halogens.

Homsy does show and describe a glove treated on the outer surface to make it non-sticky so that powder is not needed to prevent adhesion of the latex. Homsy does not treat the inner surface but, interestingly, he does disclose the concept of controlled outer surface treatment to obtain a degree of slipperiness that eliminates the need for powder. Homsy disclosed only the treating of the outer surface of the glove and does not disclose making the inner surface slippery for easy insertion of the surgeon's hand.

U.S. Pat. No. 4,597,108 entitled "Powder Free Surgical Gloves" issued to Akira Momose who is also one of the inventors of the present invention describes a preferred method for producing a surgeon's glove from pure latex rubber that is treated on both the outer surface and on the inner surface and in different degrees of halogenation to thereby obtain a desired inner surface frictional coefficient which is different from the outer surface frictional coefficient.

By controlling the halogenation process to obtain different degrees of slipperiness, Momose discloses how to produce a glove having a desired degree of slipperiness on the inner surface that allows the surgeon to insert his hands without difficultly and at the same time provides a different degree of slipperiness on the outer surface to thereby enhance the surgeon's ability to handle the necessary surgical instruments with minimum of difficultly.

The prior art methods of producing chlorinated water generally include one of the three following methods:
1. The direct injection of chlorine gas into the water mixture.
2. Mixing high density bleaching powder and aluminum chloride in water.
3. Brine electrolysis to produce chlorinated water.

Unfortunately the prior art methods of producing chlorinated water results in the generation of chlorine gas that is released into the air in excessive quantities and in a manner that is not tightly controlled in the area of the glove being processed.

In view of the need to halogenate the outer surface to a different degree than the inner surface, it is necessary to have a very tightly controlled method of producing the chlorinated water and in the immediate area of the gloves being processed.

Unfortunately the prior art methods do not provide the tight controls necessary thereby resulting in products that are less than satisfactory from a quality control standpoint. The cost of production is unnecessarily high due to the high scrap rate entailed by the lack of control over the halogenation process.

In the present process there is described an improved method for generating chlorinated water that results in less free chlorine gas being released into the air and in which the chemical reaction generates chlorine gas in largely localized areas close to the glove surface being processed. This allows a higher measure of control over the halogenation of the surface of the glove, whether it be the inner surface or the outer surface that is being processed, thereby resulting in a product having a higher quality control and with less waste than in the prior art methods.

The improved method of generating chlorine gas and halogenating the gloves on the outer surface to a different degree than the halogenation of the glove on the inner surface is as follows:

The glove constructed of latex is fitted over a hand shape mold with the outer surface on the outside. The glove is then immersed for approximately 8 to 10 seconds in sodium hypochlorite solution containing 1.5% effective chlorine. Immediately following the immersion, the gloves are removed and then immersed for 8 to 10 seconds in 0.16% hydrochloric acid solution after which they are removed, washed and dried.

After the treatment to the outer surface, the glove is removed from the mold and turned inside out and refitted over the mold. The glove is then immersed for approximately 8 to 10 seconds in a sodium hypochlorite solution containing 6% effective chlorine. Immediately following this immersion, the glove is immersed for 8 to 10 seconds in a 12% hydrochloric acid solution. This treatment of the inner surface is repeated 3 or more times depending upon the degree of slipperiness required for the inner surface.

The described process imparts different degrees of slipperiness to the outer and inner surface of the glove, and because the chemical reaction generating chlorine gas is largely localized to the glove surface area, there is a greater control over the process resulting in greater efficiency. This procedure of halogenation does not release a large amount of chlorine gas into the air since the chemical reaction occurs tightly in the area of the gloves being processed.

Further objects and advantages of the present invention will be made more apparent by referring to the attached drawing which illustrates a flow chart of the preferred method for processing both the inner surface and the outer surface of the glove.

Rubber surgical gloves have been in use for nearly 100 years beginning near the end of the last century. The gloves have a three-fold purpose, first, to prevent the contamination of the area of the surgery from the germs or bacteria that remain on the fingers of the surgeon, secondly, the gloves protect the surgeon from infection by germs located in the patient and, thirdly, the gloves protect the skin of the surgeon from any inflammations that could be caused by the medicines and drugs being used during the surgery itself.

The materials used in the manufacture of surgical gloves have included natural rubber and vinyl chloride. Natural rubber has good stretchability, adheres closely to the fingers, and has good tactile feeling during wearing, Unfortunately, inserting the fingers into natural rubber gloves is very difficult due to the adhesiveness of the surface of the gloves.

Vinyl chloride gloves on the other hand have many problem areas in that they are not stretchable, do not adhere closely to the skin, and have very inferior tactile feelings.

As a result of these considerations and the desires of the surgeons themselves, various kinds of powders have been added to the surface of rubber surgical gloves to make them slippery and easy to use. Common talc (magnesium silicate), corn starch powder and other powders have been primarily used as well as sodium bicarbonate, potassium bitartaric acid, calcium stearic acid, powder from plants such as lycopodium powder, fatty acids, magnesium oxide, mica and other substances have been used and suggested.

Unfortunately, all of the above substances mentioned cause harm and damage to the human body. For example, talc adheres to the surgical wounds and causes granuloma to the human tissue, and for this reason talc is not good for the healing of wounds. It has also been discovered that powder causes the festering of wounds, peritonitis, anal fistula, intestinal obstruction, meningitis, scarring of brain tissue, and inflammation of the nervous system, just to mention some of the disadvantages.

Recent discovery also indicates that powder may even have caused the death of some patients.

Corn starch, on the other hand, is not as violent as talc but does create other problems, causing allergic reactions and possibly serving as a carrier for infectous bacteria and germs.

There seems to be no question in the minds of the experts of today that powder on surgical gloves is objectionable. Many surgeons, however, think that it is sufficient to wash the outer surface of the gloves with sterilized water after putting on the surgical gloves, believing that such action removes all powder and talc. Unfortunately, studies verified by Dr. Richard A. Villasenor show that, even after the surgical gloves have been washed three or more times in water, examination of the gloves with an optical microscope or a scanning electron microscope reveals that there are still numerous particles of talc powder remaining on the outer surface of the gloves and adhering to the surface. In other words, it is not possible to completely remove all the powder by simply washing the gloves with water.

In addition, it has been discovered that where powder is utilized on the inside of the gloves to facilitate the use of the glove, powder from the inside of the glove may spill out from the sleeve of the gloves and contaminate the area of the surgery. In addition, the gloves are sometimes torn while being used and powder from the inside does spill out causing infection and contamination as mentioned above. Last but not least, there is always the problem of determining whether sterilized water used to wash the gloves is truly in fact sterile.

The present invention is concerned primarily and uniquely with the production of an improved surgical natural rubber glove that completely and once and for all eliminates the need for powders of any kind.

In the practice of the present invention, both the inner and outer surfaces of the natural latex rubber glove are treated with chlorine during the halogenation process but are halogenated to different degrees of slipperiness between the outer and inner surfaces.

It is thus possible to have a halogenated latex rubber glove that preserves the external tactile feeling needed by the surgeon to securely hold his instruments, together with the ease of use that makes it convenient for the surgeon to insert his hand in the glove and without the need of powder of any kind.

In the practice of the present invention, the outer surface of the glove is treated with less chlorine and the inner surface with more chlorine when manufacturing the glove in order that the fingers may be inserted easily into the gloves and still allow the surgical instruments to be held firmly.

In the manufacture of the glove, a mold is chosen that fits the shape of the surgeon's hand and the glove is made with both the back of the hand and palm of the hand accentuated, thereby allowing the glove to respond freely with the bending of the fingers during use.

The main invention covers the method of manufacturing the surgical glove by dipping natural rubber gloves in a sodium hypochlorite solution which is 1.5% effective chlorine for a period of time ranging from 8 to 10 seconds after which the glove is then dipped in a 0.16% hydrochloric acid for a period of time ranging from 8 to 10 seconds.

In treating the inner surface, the glove is turned inside out and fitted over the molds as previously described and then dipped in a sodium hypochlorite solution which is 6% effective chlorine for a period of time ranging from 8 to 10 seconds. The gloves are then dipped in a 12% hydrochloric acid solution for a period of time ranging for 8 to 10 seconds. This step is preferably repeated more than 3 times depending upon the degree of slipperiness required. The differential chlorination process described imparts different degrees of slipperiness to the outer and inner surfaces.

Referring now to the accompanying flow diagram there is described in more detail an example of an actual test conducted on the method of manufacturing surgical gloves treated with chlorine based upon the teachings of the present invention and in which the individual steps have been identified in the accompanying drawing.

Referring now to the accompanying drawing, there is shown a flow diagram comprising a plurality of steps for processing latex rubber gloves according to the teachings of the present invention to produce a halogenated outer surface that is different from the halogenated inner surface.

STEP 1: When making surgical gloves from regular natural rubber (latex), the hand-shaped mold made of a ceramic material is dipped in a coagulant solution containing calcium nitrate or calcium chloride.

STEP 2: The hand shaped mold is dipped in a solution containing 40% pure rubber (latex). A very small amount of ammonium chloride is added to this natural rubber solution to act as a stabilizer.

STEP 3: The hand shaped mold is pulled out of the natural rubber solution and the mold is turned over many times in order to produce a uniform thickness of the rubber. The glove is then placed in a stationary position with the fingers pointed upwards. This is done for the purpose of making the finger portions of the glove relatively thin on the order of 170 microns while the back side of the palm portion of the glove is relatively thick. The glove is then dried in this position.

STEP 4: The natural rubber adheres to the hand shaped mold and after the rubber glove is dried the hand shaped mold is dipped into warm water.

STEP 5: The natural rubber becomes slightly soft from the warm water which then allows the glove to be peeled off the mold.

STEP 6: The glove is again dipped in water and washed with water for the purpose of removing the calcium nitrate or calcium chloride that was used as set forth in Step 1.

STEP 7: The glove is dipped in a sodium hypochlorite solution containing 1.5% effective chlorine for approximately 8 to 10 seconds.

STEP 8: The glove is immediately immersed in a 0.16% hydrochloric solution for approximately 8 to 10 seconds.

STEP 9: The glove is washed in water for approximately one hour to remove the chlorine residue.

STEP 10: The glove is then turned inside out and refitted over the mold and again immersed in a solution of sodium hypochlorite solution containing 6% effective chlorine for approximately 8 to 10 seconds.

STEP 11: The glove is then immediately immersed in a 12% hydrochloric acid solution for approximately 8 to 10 seconds. This treatment of the inner surface as set forth in Step 10 and Step 11 is repeated at least 3 times, depending upon the degree of slipperiness to be achieved.

STEP 12: The glove is washed in water one more time for approximately one hour to remove all chlorine residue.

STEP 13: The glove is dried and then sterilized, preferably with ethylene oxide gas (EOG).

Natural rubber surgical gloves produced by the method described allow the surgeon to more easily insert his hand into the glove while at the same time providing the tactile feel necessary for the surgeon to precisely hold and control the surgical instruments.

We claim:

1. A method of halogenating natural rubber surgical gloves on both the inner surface and outer surfaces to different degrees, comprising the steps:
    fitting the natural rubber glove over an appropriate hand shaped mold,
    then dipping the glove in sodium hypochlorite solution which is 1.5 percent effective chlorine approximately 8 to 10 seconds,
    then dipping the glove in a 0.16 percent hydrochloric acid for approximately 8 to 10 seconds,
    then washing the glove in water until all chlorine residue is removed,
    then removing the glove from the mold and turning the glove inside out and fitting the glove over the hand shaped mold,
    then dipping the glove in sodium hypochlorite solution which is 6 percent effective chlorine for approximately 8 to 10 seconds,
    then dipping the glove in 12 percent hydrochloric acid for approximately 8 to 10 seconds, and
    then repeating the last mentioned two steps at least three times to obtain a different degree of halogenation on the inner surface then is on the outer surface,
    then washing the glove in water until all chlorine residue is removed.

2. A method of halogenating natural rubber surgical gloves on the outer surface comprising the steps of:
    fitting the natural rubber glove over an appropriate hand shaped mold,
    then dipping the glove in sodium hypochlorite solution which is 1.5 percent effective chlorine for approximately 8 to 10 seconds,
    then dipping the glove in a 0.16 percent hydrochloric acid for approximately 8 to 10 seconds, and
    then washing the glove in water until all chlorine residue is removed.

3. A method of halogenating natural rubber surgical gloves on the inner surface comprising the steps of:
    first turning the glove inside out and fitting the natural rubber glove over an appropriate hand shaped mold,
    then dipping the glove in sodium hypochlorite solution which is 6 percent effective chlorine for approximately 8 to 10 seconds,
    then dipping the glove in 12 percent hydrochloric acid for approximately 8 to 10 seconds,
    then repeating the last mentioned step at least three times to obtain a desired degree of halogenation on the inner surface, and
    then washing the glove in water until all chlorine residue is removed.

* * * * *

UNITED STATES PATENT AND TRADEMARK OFFICE
CERTIFICATE OF CORRECTION

PATENT NO. : 4,851,266
DATED : Jul. 25, 1989
INVENTOR(S) : Akira Momose

It is certified that error appears in the above-identified patent and that said Letters Patent is hereby corrected as shown below:

On the title Page:

In the abstract the word "within" should read --without--

Signed and Sealed this

Seventeenth Day of July, 1990

Attest:

HARRY F. MANBECK, JR.

Attesting Officer

Commissioner of Patents and Trademarks